United States Patent Office 3,002,947
Patented Oct. 3, 1961

3,002,947
DELUSTERED AND STABILIZED POLYAMIDE
Donald Elwood Maple, Seaford, Del., assignor to E. I. du Pont de Nemours and Company, Wilmington, Del., a corporation of Delaware
No Drawing. Filed May 22, 1959, Ser. No. 814,947
9 Claims. (Cl. 260—37)

This invention relates to the manufacture of delustered and stabilized polyamides and to the process of melt spinning filaments therefrom. In particular, it relates to a process for obtaining and maintaining an adequate dispersion of $TiO_2$ delusterant in a polyamide stabilized by a manganous salt, and melt spinning the so-delustered and stabilized polyamide.

Processes for delustering polyamide yarns by addition of $TiO_2$ during the polymerization process are known (U.S. Patent 2,205,722—Graves to Du Pont and U.S. Patent 2,278,878—Hoff to Du Pont). When polyamides containing $TiO_2$ are stabilized against heat and light degradation by adding, also during the polymerization, a manganous salt such as manganous hypophosphite, the $TiO_2$ delusterant tends to agglomerate. This agglomeration has a deleterious effect on the melt spinning process in that the agglomerated $TiO_2$ accumulates in the sand pack of the spinneret assembly and makes frequent replacement of the sand pack necessary. These frequent replacements are particularly undesirable in a large scale commercial operation.

The polymerization process of the present invention is generally as follows: a dilute solution of hexamethylene diammonium adipate in water, to which a small amount of viscosity stabilizer (e.g., 0.1 mol percent of 25% aqueous acetic acid solution) has been added, is concentrated to between 70 and 80% in an evaporator and transferred to an autoclave kept under steam pressure. The closed autoclave is heated while the pressure increases to 250±5 p.s.i. The pressure is kept at this value by bleeding off steam while heating is continued. When the temperature reaches 195±5° C., a 10–25% aqueous slurry of $TiO_2$ is added to the solution containing at least 70% salt over a period of 5–10 minutes. During and after this period the heating is continued at 250±5 p.s.i. pressure. When the average molecular weight has reached a value of at least 1700 in at least 30 minutes from the time that the addition of $TiO_2$ slurry was completed, a 5–13% aqueous manganous salt solution is added from a separate pot. Again, during and after this addition, the heating at 250±5 p.s.i.g. pressure is continued until the temperature has reached 245±5° C. The pressure is then gradually reduced while the heating is continued. The pressure reduction and heating are timed so that in about 90 minutes from the time the pressure reduction is started, the temperature has reached 265–270° C. and the pressure has been reduced to atmospheric. Heating at atmospheric pressure is continued to raise the reaction temperature to 270–275° C. and to complete the polymerization.

A general object of this invention is to provide an improved process for preparing delustered and stabilized polyamides and melt spinning filaments therefrom.

A more specific object is to provide a process for dispersing $TiO_2$ delusterant in polyhexamethylene adipamide during its polymerization and for dissolving a manganous salt in said polyhexamethylene adipamide (already containing the $TiO_2$) in the substantial absence of agglomeration of the delusterant.

Another object is to increase the life of the sand pack of the spinneret assembly through which is spun polyhexamethylene adipamide containing both $TiO_2$ delusterant and manganous salt stabilizer.

These and other objects are accomplished by a critical selection of conditions for adding $TiO_2$ and Mn salt, as follows:

The addition of from about 0.01 to about 5% by weight (of the dry adipate) of $TiO_2$, during the evaporation of water from an aqueous solution of hexamethylene diammonium adipate, is started when the concentration of the salt is at least about 70% and is completed between 5 to 10 minutes from the start of the addition and before the concentration reaches 100%. The addition of from about 0.001 to about 0.125% by weight (of the dry adipate) of Mn salt during the polymerization is started when both of the following two conditions are fulfilled: (1) the average molecular weight exceeds about 1700 and (2) at least about 30 minutes have elapsed since the completion of the addition of $TiO_2$. The addition of Mn salt preferably is completed before the pressure reduction is started.

The average molecular weight can be determined by titration of end-groups (carboxyl and amino groups) according to well-established procedures (J. E. Waltz and G. B. Taylor: "Determination of Molecular Weight of Nylon," Anal. Chem. 19, 448–450 (1947)).

The $TiO_2$ delusterant should be of sufficient purity and fineness. When impure $TiO_2$ of high ionic content is employed, agglomeration may occur even when the conditions of the addition are selected according to this invention. The $TiO_2$ is of sufficient purity when it meets the following test: 100 grams of $TiO_2$ are slurried in 500 ml. of water and the conductivity of the solution is measured at 30° C. The ionic content of $TiO_2$ is sufficiently low if resistance is at least 7000 ohms/cm.

The diameter of the $TiO_2$ particles preferably does not exceed 25 microns. It is also preferred that one or more filters of suitable fineness (200 mesh) be placed in the transfer line from the slurry tank to the autoclave. These filters will prevent agglomerates caused by use of poor quality $TiO_2$ or inadequate cleaning from entering the polymer and causing plugging of sand packs during spinning operations.

Particularly suitable are $TiO_2$ pigments which are coated with aluminum oxide. A coating of about 1% is adequate. Examples of commercially available pigments of this type are LO–CR pigment marketed by E. I. du Pont de Nemours and Company and Unitane O–310 marketed by National Lead Company.

Manganous salts suitable as stabilizers include manganous salts with a reducing anion, such as manganous hypophosphite, manganous oxalate, manganous pyrophosphate. For the purposes of this invention, a "reducing anion" has a standard electrode potential (referred to the hydrogen electrode at 25° C.) exceeding 0.1 $n$ volts, where $n$ is the number of electrons liberated by oxidation of the anion.

Example 1

A 48% aqueous solution of hexamethylene diammonium adipate (nylon salt) and 0.5 mol percent of a 25% aqueous acetic acid solution (viscosity stabilizer) are charged to an evaporator and concentrated to 75% at 13 p.s.i. pressure, which corresponds to a final temperature of about 140° C. The 75% salt solution is transferred to an autoclave with steam atmosphere and heated in the closed autoclave until the steam pressure reaches 250 p.s.i in about 20 minutes. When this pressure is reached, bleeding off steam is started, maintaining 250 p.s.i. pressure, while the heating is continued until the concentration of salt is 80%, which corresponds to a temperature of 195° C. At this concentration, the charging of 2.0% by weight of a 20% aqueous slurry of $TiO_2$ is started and completed over a period of 7 minutes. During this period of $TiO_2$ addition, the autoclave temperature is raised at a rate of approximately 1.6° C. per minute and the pressure is maintained at 250 p.s.i. After the $TiO_2$ charge is completed, the heating and bleeding off at 250 p.s.i. are continued until the average molecular weight of the polymerizing mixture reaches 1800, in about 45 minutes from the time the $TiO_2$ charge is completed. This corresponds to a temperature of 238±5°. When this molecular weight is reached, .02 weight percent of 10% aqueous manganous hypophosphite solution is added from a separate pot. The weight percentage is based on the total weight of dry solid manganous salt and weight of polymer. During this addition, the heating is continued and autoclave temperature is raised at a rate of approximately 0.75° C. per minute and the steam bleeding at 250 p.s.i. is continued. After this addition is completed (approximately one minute), the heating at 250 p.s.i. is continued until the temperature reaches 245° C. At this temperature the pressure reduction is started and continued over a period of about 90 minutes so that the temperature has reached 270° C. when the pressure has been reduced to atmospheric. Heating at atmospheric pressure is continued until 275° C. to complete the polymerization. The autoclave is brought to 100 p.s.i. pressure of inert gas (nitrogen and carbon dioxide) and the molten polymer is discharged as a ribbon by extruding it from the autoclave through a narrow slit. The ribbon is quenched on a water cooled casting wheel and cut into ½ inch flakes.

The polymer flakes so-prepared are essentially free of agglomerated $TiO_2$ and the life of sand packs of spinneret assemblies through which the so-prepared flake is spun is 12 days or longer. The polymer flakes are also stable in sunlight.

I claim:

1. In the process of preparing polyhexamethylene adipamide, the improvement comprising concentrating an aqueous solution of hexamethylene diammonium adipate, adding from 0.01–5% by weight (dry $TiO_2$ based on dry adipate) of $TiO_2$ in a slurry when the concentration of the adipate solution is at least about 70% but before any appreciable polymerization has taken place, heating the solution under polymerization conditions, and adding trace amounts of a manganous salt having a reducing anion when the molecular weight of the polyhexamethylene adipamide is greater than about 1700 and after at least about 30 minutes from the completion of the addition of $TiO_2$.

2. The process of claim 1 wherein the $TiO_2$ addition is completed between about 5 and about 10 minutes from the start of the addition and before the concentration of the adipate solution reaches 100%.

3. The process of claim 1 wherein the $TiO_2$ is of low ionic content.

4. The process of claim 3 wherein the $TiO_2$ is in the form of particles no greater than 25 microns in diameter.

5. The process of claim 4 wherein the $TiO_2$ particles are coated with about 1% by weight (of the particles) of aluminum oxide.

6. The process of claim 3 wherein the standard electrode potential of the reducing anion exceeds 0.1 $n$ volt, where $n$ is the number of electrons liberated by the anion upon oxidation.

7. The polymerization process comprising providing a dilute aqueous solution of hexamethylene diammonium adipate, concentrating said solution to about 70% adipate, adding about 0.01 to about 5 parts by weight (dry $TiO_2$ based on dry adipate) of a 10–25% aqueous slurry of $TiO_2$, heating said solution at a temperature between about 190° and 200° C. for at least about 30 minutes from the time the addition of $TiO_2$ is completed, whereby the polymerization of hexamethylene adipamide begins, continuing said heating until the molecular weight of polyhexamethylene adipamide reaches about 1700 and adding about 0.001 to about 0.125% by weight (dry manganous salt based on dry adipate) of a manganous salt in a 5–13% aqueous solution, said manganous salt having a reducing anion.

8. The process of claim 7 wherein the $TiO_2$ is of low ionic content.

9. In the polymerization of polyhexamethylene adipamide, the steps of: concentrating a dilute aqueous solution of hexamethylene diammonium adipate; adding from 0.01–5% by weight (dry weight based on dry adipate) of particulate $TiO_2$ in an aqueous slurry to the concentrated adipate solution over a period of from 5–10 minutes beginning after the latter solution has reached a concentration of at least 70% adipate and before the reaction temperature has reached 200° C.; continuing the polymerization reaction for a period of at least 30 minutes and until the polymer molecular weight exceeds 1700; adding from 0.001–0.125% by weight (dry weight based on dry adipate) of a manganous salt in aqueous solution, said manganous salt having a reducing anion; and continuing the reaction to completion.

References Cited in the file of this patent

UNITED STATES PATENTS

| | | |
|---|---|---|
| 2,205,722 | Graves | June 25, 1940 |
| 2,278,878 | Hoff | Apr. 7, 1942 |
| 2,671,770 | Chezand | Mar. 9, 1954 |

FOREIGN PATENTS

| | | |
|---|---|---|
| 793,132 | Great Britain | Apr. 9, 1958 |